US012631190B2

(12) United States Patent
Stauff

(10) Patent No.: US 12,631,190 B2
(45) Date of Patent: May 19, 2026

(54) GEARED TURBOMACHINE

(71) Applicant: Ulrich Stauff, Cologne (DE)

(72) Inventor: Ulrich Stauff, Cologne (DE)

(73) Assignee: ATLAS COPCO ENERGAS GMBH, Cologne (DE)

( * ) Notice: Subject to any disclaimer, the term of this patent is extended or adjusted under 35 U.S.C. 154(b) by 0 days.

(21) Appl. No.: 18/442,739

(22) Filed: Feb. 15, 2024

(65) Prior Publication Data

US 2024/0280112 A1 Aug. 22, 2024

(30) Foreign Application Priority Data

Feb. 17, 2023 (DE) .......................... 202023100768.6

(51) Int. Cl.
| *F16H 1/22* | (2006.01) |
| *F04D 25/02* | (2006.01) |
| *F04D 25/16* | (2006.01) |
| *F04D 29/054* | (2006.01) |
| *F16H 57/021* | (2012.01) |
| *F16H 57/02* | (2012.01) |

(52) U.S. Cl.
CPC ........... *F04D 25/163* (2013.01); *F04D 25/02* (2013.01); *F04D 29/054* (2013.01); *F16H 1/22* (2013.01); *F16H 57/021* (2013.01); *F16H 2057/02073* (2013.01)

(58) Field of Classification Search
CPC ...... F04D 25/163; F04D 25/02; F04D 29/054;

F04D 17/12; F16H 1/22; F16H 57/021; F16H 2057/02073; F16H 57/031; F16H 2057/02008; F16H 57/02; F16H 2057/02039; F01D 15/12
See application file for complete search history.

(56) References Cited

U.S. PATENT DOCUMENTS

| 10,465,769 | B2 * | 11/2019 | Zimmermann | ....... | F04D 25/163 |
| 2006/0156728 | A1 * | 7/2006 | Rodehau | .............. | F04D 25/163 |
| | | | | | 60/670 |
| 2017/0276215 | A1 * | 9/2017 | Zimmermann | ....... | F04D 25/163 |
| 2017/0350494 | A1 * | 12/2017 | Weule | ................... | F16H 57/021 |

FOREIGN PATENT DOCUMENTS

DE 202018107058 U 3/2019

* cited by examiner

*Primary Examiner* — Aaron R Eastman
(74) *Attorney, Agent, or Firm* — Andrew Wilford

(57) ABSTRACT

A geared turbomachine has a transmission housing with a upper part and a lower part joined to the upper part along a main joint extending at least in sections perpendicular to a vertical direction. A main gear is in the transmission housing and a first pinion cover is connected to the upper part along a first pinion joint consisting of a first horizontal section extending perpendicular to the vertical direction and a first vertical section extending from the first horizontal section at a first angle. A first pinion shaft has a first shaft body in the first pinion joint and in the transmission housing and carries a first pinion meshing with the main gear. A first turboimpeller is fixed to the first shaft body.

11 Claims, 2 Drawing Sheets

GEARED TURBOMACHINE

FIELD OF THE INVENTION

The invention relates to a geared turbomachine.

BACKGROUND OF THE INVENTION

A typical turbomachine has a transmission housing, a large main gear received in the transmission housing, and at least a first pinion shaft. The first pinion shaft has a first shaft body and a pinion fixed thereon and meshing with the main gear in the transmission housing with a first turboimpeller connected to the first shaft body. The transmission housing has at least a lower part and at least one upper part joined to the lower part along at least one main joint of which at least part extends perpendicular to the vertical. A first pinion cover is connected along a first pinion joint to the upper part, and the first pinion shaft is in the first pinion joint.

A turbomachine serves to convert the pressure and/or flow energy of one or several process fluids into mechanical rotary motion and vice versa. This includes for example turbopumps, turbocompressors, turboexpanders or turbines. Turbomachines are often used in process engineering plants and/or in plants for energy conversion, such as for example power plants or plants for heat-energy recovery.

Since often several turbomachines are operated in parallel, they can be coupled mechanically by a transmission. One speaks in this case of a so-called geared turbomachine. The invention relates to particular variants in which a central main gear is provided meshing with one or several pinions on shafts so that rotation of the main gear is transmitted directly to all of the pinions and vice versa. For this purpose the big gear wheel is rotatable around a center (main-gear) axis in the transmission housing. The mechanical coupling ensures that the speeds of the individual pinion shafts and of the main gear are in fixed ratios to each other and enables load distribution and summation of the loads with one another.

Depending on which direction the energy transmission takes place, the main gear can be coupled to an energy transmitter for input or output. The individual pinion shafts on the other hand are usually without direct drive or output, such as for example designed by an electric motor or generator. Nevertheless it is possible in a geared turbomachine to combine the same or different pinion shafts driven turboimpellers (for example compressor impellers) and driving turboimpellers (for example expander impellers) are combined with each other.

For assembly and maintenance purposes of the transmission and of the individual pinion shafts, in particular of their turboimpellers, it is necessary to be able to temporarily open the transmission housing. The invention is based on an embodiment with a lower part and an upper part that can be separated from one another in order to open the transmission housing. To seal the upper part and the lower part against each other, these are clamped to each other.

In this case the upper part and the lower part connect to one another along a main joint extending at least in sections perpendicular to the vertical, which is in particular identical with the direction of gravity. As a result it is possible that the upper part and the lower part initially rest on each other without additional securing, without the upper part of the housing slipping off the lower part of the housing.

For a particularly simple assembly and maintenance of the first pinion shaft, a first pinion cover is provided that is connected along a first pinion joint to the upper part. This way the main joint and the first pinion joint do not touch.

The first pinion shaft is in the first pinion joint so that it is accessible after removal of the first pinion cover along the first pinion joint and the removal of the first pinion shaft is not hindered by the transmission housing. After such loosening, opening, and/or removing, further components in the transmission housing such as for example bearing assemblies and the first pinion shaft can then be removed from the transmission housing.

Generic geared turbomachinery is known, for example, from U.S. Pat. No. 10,465,769 and DE 20 2018 107 058.

OBJECT OF THE INVENTION

Against this background the object of the invention is to simplify the manufacture and maintenance of a geared turbomachine. In so doing, in particular the assembly or the replacement of individual pinion shafts is to be simplified.

SUMMARY OF THE INVENTION

According to the invention the first pinion joint consists of a first horizontal section extending perpendicular to the vertical direction and a first vertical section extending at a first angle from the first horizontal section. In other words the upper part of the housing forms a step-shaped receptacle, into which the first pinion cover is inserted as a blunt, pointed, or right angled wedge. The first horizontal section and the first vertical section abut at a first edge directly against each other. At the transition from the first horizontal section to the first vertical section, there is in particular a technically needed rounding with a radius of curvature of not more than 5 cm.

In particular, the first horizontal section extends wholly in a horizontal plane perpendicular to the vertical direction up to the edge of the transmission housing and is formed in this area by the upper part of the housing and the first pinion cover. As a result, that the first horizontal section runs perpendicular to the vertical direction (direction of gravity), the first pinion cover can be set on a bearing surface of the upper part, where they abut against each other along the first horizontal section.

The first turboimpeller is preferably arranged in a first housing. It thus forms a first stage in which a first process fluid is compressed from a first inlet pressure by the rotating first turboimpeller to a first outlet pressure. The first input pressure can be higher or lower than the first output pressure level, depending on whether the first stage is a compressor stage or an expander or turbine stage.

According to a preferred embodiment the geared turbomachine has several stages. These can be used independently of each other and/or together in combination. In particular two or several, in particular all of the geared turbomachine stages operate with the same process fluid. Here the stages in particular can be arranged in the same process flow, in particular in series and/or in parallel to each other. Also it is possible that the geared turbomachine serves several, independent process flows and/or circuits. For example a part of the transmission—turbomachine can be formed as a multistage compressor.

Furthermore it is possible that one or several stages are formed in a process flow or circuit for extracting mechanical energy from heat. For example, a compressor and an expander stage can be part of a cycle, in particular using supercritical carbon dioxide ($SCO_2$).

Preferably a first pinion shaft is provided at least a further turboimpeller to form a further stage. Here may in particular be provided, that the further turboimpeller is arranged on the opposite side of the main gear relative to the first turbo-impeller.

In particular the first turbocharger (and/or any further turbocharger) is mounted outside the housings on an outer end of the first pinion shaft. This enables a particularly space-saving arrangement of the stages.

The first turboimpeller is preferably accommodated in a first impeller housing that is attached to the transmission housing and/or is formed in one piece with the transmission housing. In particular at least a part of the transmission housing is of the same material and extends without inter-ruption to the transmission housing or to at least one of its components.

According to a particularly preferred embodiment the first impeller housing is divided along the first pinion joint. Thus, it is possible to remove the first pinion cover with the first impeller housing. This enables removal of the turboimpeller from the first impeller housing.

According to a particularly preferred embodiment the first vertical section is perpendicular to a first normal direction. The first normal direction and the vertical direction, thus form the first angle. According to this preferred embodiment the first horizontal section extends wholly in a horizontal plane and the first vertical section wholly in a first vertical plane that forms with respect to the horizontal plane the first angle. This configuration facilitates both the fastening and the sealing at the transition between the first pinion cover and the upper part.

According to a particularly preferred embodiment the first angle is less than or equal to 90°. According to a first preferred variant the first angle is between 30° and 60°, in particular approximately 45°.

According to an alternative particularly preferred embodi-ment, the angle is exactly 90°. Here the first pinion joint forms a L-shaped right-angled joint between the lower part and the first pinion cover. In these configurations, the pinion cover can be placed particularly simply from above in the vertical direction onto the upper part.

Preferably the geared turbomachine has a second pinion shaft itself having a second shaft body carrying a second pinion meshing with the main in the transmission housing and at least a second turboimpeller on the second shaft body. The second turboimpeller is in particular in a second impel-ler chamber and forms a second stage.

Particularly preferably a second pinion cover connects along a second pinion joint to the upper part with the second pinion shaft in the second pinion joint. The second pinion joint consists of a second horizontal section extending perpendicular to the vertical and a second vertical section extending at a second angle from the second horizontal section. The formation of a second angled pinion cover enables also the modular and maintenance and removal of the second pinion shaft independent of the first pinion shaft.

Particularly preferably the second vertical section runs perpendicular to a second normal direction. Here the second vertical direction forms with the second normal direction the second angle. The horizontal section and vertical section of the second pinion joint formed in a plane, assembly and sealing are also simplified.

According to a particularly preferred embodiment the first angle and the second angle are of equal size. As a result, the first pinion cover and the second pinion cover have a similar composition and the assembly can be standardized. Accord-ing to a particularly preferred embodiment the first pinion cover and the second pinion cover are interchangeable with each other, in particular identical.

Particularly preferably the inventive geared turbomachine has a plurality of pinion shafts each having a respective shaft body carrying a respective pinion meshing with the big wheel in the transmission housing and a respective turbo-impeller connected with this shaft body. Each of these pinion shafts is thereby either in the main joint or in a pinion joint and a respective pinion cover is connected to the housing upper part. All of the pinion joints and the main joint are thereby in pairs not connected to each other. Within the framework of this configuration, particularly easy assembly or maintenance of the individual pinion shafts is possible. In the main joint no, one or two pinion shafts can be arranged on both sides of the main gear.

Preferably each of the pinion joints consists of a horizon-tal section extending perpendicular to the vertical direction and an adjoining horizontal section extending at an angle from the vertical section. Here the angle associated with the pinion shafts are particularly preferably of the same size.

Furthermore in the framework of the invention particu-larly preferably each pinion joint holds a single respective pinion shaft. The respective pinion cover fitted to each pinion joint on the upper part (or if applicable lower part), is thus associated with a respective pinion shaft. In order to be able to remove this pinion shaft from the transmission housing, in each case one need only remove the respective pinion cover along the pinion joint.

In embodiments with several pinion shafts, these can also have additional turboimpellers for forming additional stages within the framework of the invention. According to a particularly preferred embodiment each of the pinion shafts has one or preferably two turboimpellers cantilevered out-side the housings on the outer shaft ends of the pinion shafts.

Preferably the main gear is rotatable about a main gear axis on the housing, preferably offset upward with respect to the main joint. This means an offset in the vertical direction (i.e. against the direction of gravity). Particularly preferred the offset is at least 5 cm, preferably between 10 cm and 50 cm.

In particular the main gear is mounted on a main gear shaft rotatably mounted in the transmission housing. Par-ticularly preferred the main gear shaft is offset by an amount upward that is greater than the radius of the main gear shaft. This allows the lower part to be formed with a continuous upper edge on which is carried the bearing for the main gear shaft. In the case of a main gear axle offset upward, the main joint particularly preferably has an upward extension.

Alternatively, the main joint can run continuously in one plane and the main gear shaft can be on held outside the upper part with a shaft bushing, in particular using a so-called bearing shield. In this case, the lower part of the housing particularly preferably has at least one upward extension projecting into the upper part of the housing, a so-called bearing block, on which the main gear shaft is mounted. In particular, the at least one bearing block is integrally cast onto the lower part.

BRIEF DESCRIPTION OF THE DRAWING

The above and other objects, features, and advantages will become more readily apparent from the following descrip-tion, reference being made to the accompanying drawing in which.

SPECIFIC DESCRIPTION OF THE INVENTION

Figure 1:
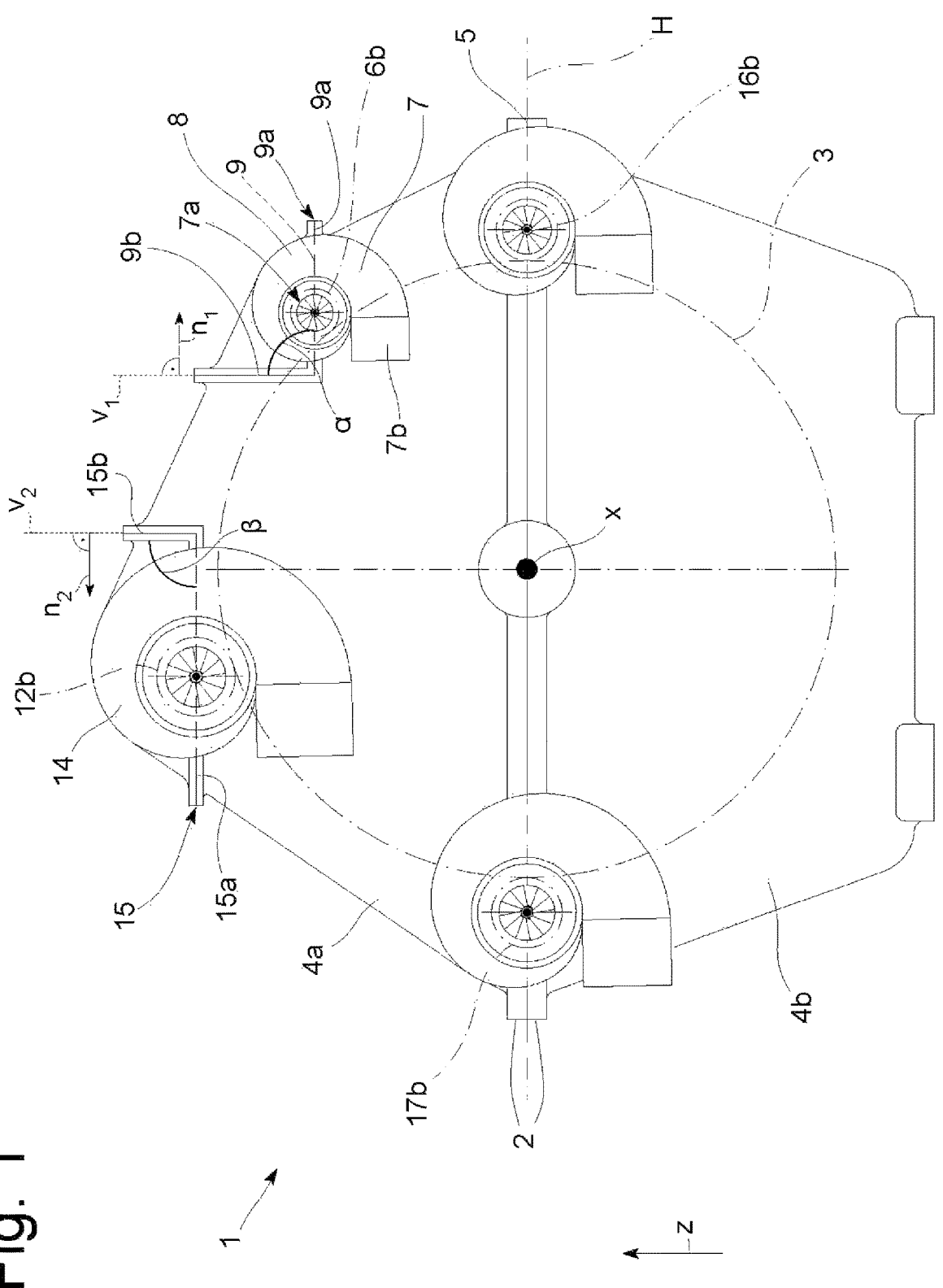
FIG. 1 is a side view of a geared turbomachine according to the invention.
Figure 2:
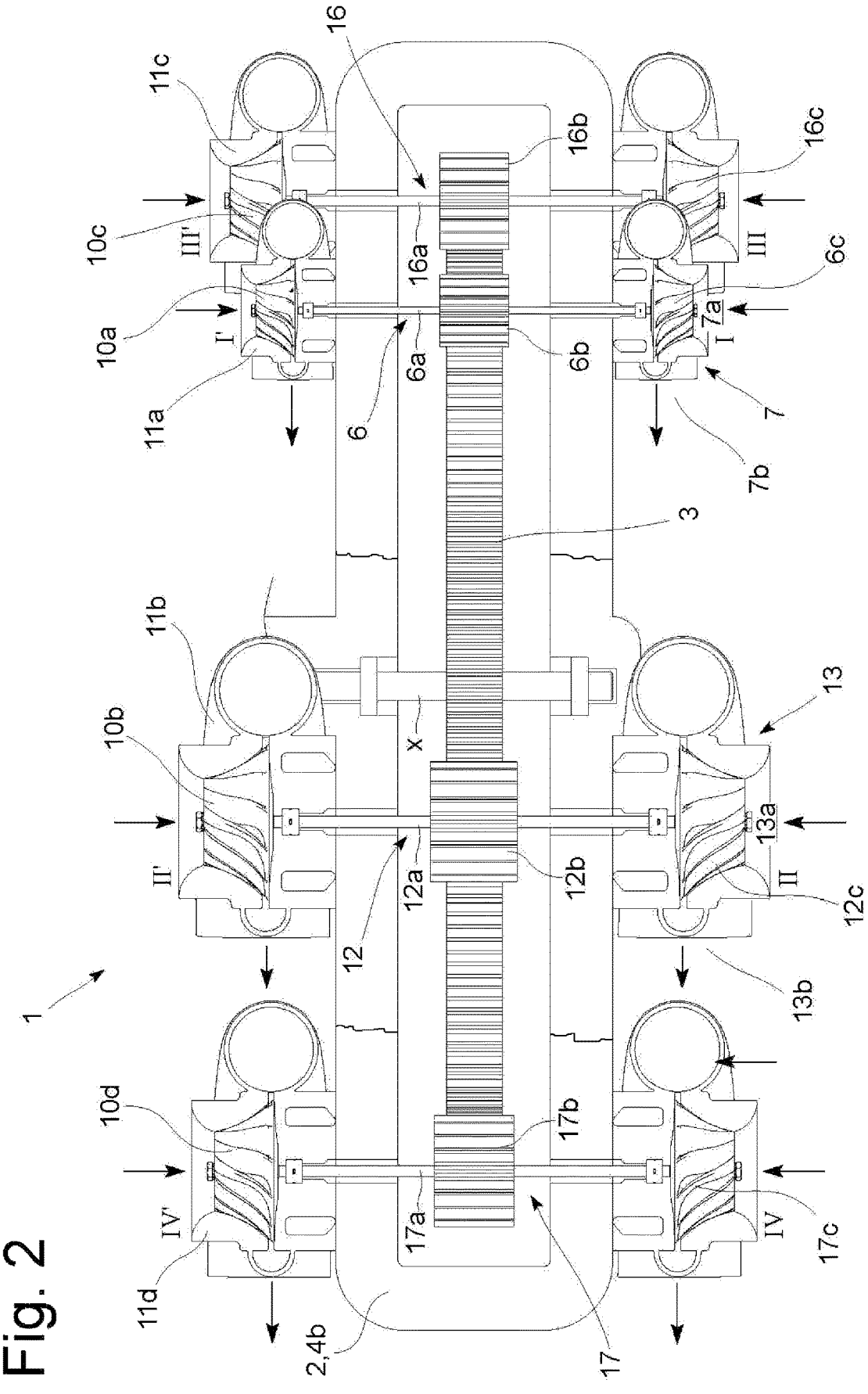
FIG. 2 is a top sectional view through three vertically offset planes of the geared turbomachine without the covers of the transmission housing.

FIGS. 1 and 2 show a geared turbomachine 1 according to the invention with a transmission housing 2 in which a large-diameter main gear 3 is rotatable about an axis x. The transmission housing 2 has an upper part 4a and a lower part 4b fitted together at a planar main joint 5. The main joint 5 extends thereby wholly in a horizontal plane H extending perpendicular to a vertical direction z.

FIG. 2 is a three level section through the geared turbomachine 1 in a top view at and above the plane H. One can here see that the geared turbomachine 1 further comprises a first pinion shaft 6 having a first shaft body 6a and a first pinion 6b meshing with the main gear 3 in the transmission housing 2. Furthermore, the first pinion shaft 6 carries a first turboimpeller 6c fixed on one outer end of the first shaft body. The first turboimpeller is in a first impeller housing 7 and forms together with it together a first stage I.

In the illustrated embodiment the geared turbomachine 1 is designed as a geared compressor and the first compressor stage I that draws in a process fluid through a first intake 7a and compresses and ejects it through a first output 7b at an increased pressure. This first turboimpeller 6c is outside the housing at one outer end of the first shaft body 6a.

A pinion cover 8 sits on the housing upper part 4a atop the first pinion shaft 6 at a first joint 9. The first pinion shaft 6 is held in the first pinion joint 9 such that, after removal of the first pinion cover 8 from the upper part 4a, the first pinion shaft 6 can be lifted off the upper part 4a of the transmission housing 2.

According to the invention, the first pinion joint 9 is L-shaped and has a first horizontal section 9a extending perpendicular to the vertical direction z and a first vertical section 9b extending at a first angle α to the first horizontal section 9a. The first pinion joint 9 extends annularly continuously from one edge of the transmission housing 2 to the other and forms a continuous interface between the first pinion cover 8 and the upper part 4a. This interface is annularly sealed except at an unillustrated shaft feedthrough for the first shaft body 6a, in order to seal the interior of the transmission housing 2 from the surrounding environment. This prevents in particular leakage of lubricant (for example oil) for the main gear 3 and the pinions meshing with it. The first shaft body 6a of the first pinion shaft 6 extends out of the transmission housing 2, so that the first turboimpeller 6c is mounted outside the transmission housing 2.

In the illustrated embodiment, not only does the first horizontal section 9a extend in a plane perpendicular to the vertical direction z but also to the first vertical section 9b. This latter section extends in a first vertical plane $v_1$ extending perpendicular to a first normal direction $n_1$. Here the vertical direction z and the first normal direction $n_1$ form a first angle α of 90° in the illustrated embodiment. Thus the first pinion joint 9 is of a right-angle L-shape and lies between the upper part 4a of the transmission housing 2 and the first pinion cover 8.

The first turboimpeller 6c forming the first stage I is outside the housing on an outer end of the shaft body 6a. Another first turboimpeller 10a forming a second stage I' is carried on the opposite outer shaft end in a respective impeller housing 11a.

The inventive concept of the wedge-shaped pinion cover can be extended. Thus in the illustrated embodiment a second pinion shaft 12 with a second shaft body 12a carrying a second pinion 12b meshing with the main gear 3 is in the transmission housing 2 and has at least one second turboimpeller 12c carried on the second shaft body 12a and forming a second turbostage II. The second turboimpeller 12c is in a second impeller housing 13 secured directly to the transmission housing 2 and in which a process fluid is conveyed and compressed between an intake 13a and an output 13b. The combination of the second turboimpeller 12c and the second impeller housing 13 forms the second stage II (compressor stage).

As can also be seen from FIG. 1, a part of the transmission housing 2 is formed by a second pinion cover 14 at a second pinion joint 15 on the upper part 4a. Here the second pinion shaft 12 is in the second pinion joint 15. The second pinion joint 15 consists of a second horizontal section 15a extending perpendicular to the vertical direction z and an adjoining second vertical section extending at a second angle β to the first vertical section 15a. In the illustrated embodiment, the second angle β is approximately 90° and is therefore the same as the first angle α.

The second vertical section 15b extends perpendicular to a second normal direction $n_2$ and in a second vertical plane $v_2$. Both the first normal direction $n_1$ and the second normal direction $n_2$ are in each case perpendicular to a main gear axis x or to the parallel axes of rotation of the pinion shafts 6 and 12.

In addition to the first pinion shaft 6 covered by the first pinion cover 8 and the second pinion shaft 12 covered by the second pinion cover 14 the geared turbomachine 1 according to the invention also has a third pinion shaft 16 with a third shaft body 16a in the illustrated embodiment, carrying a third pinion 16b and connected to the third shaft body 16 to form a third turboimpeller 16c. Likewise a fourth pinion shaft 17 with a fourth shaft body 17a, a fourth pinion 17b meshing with the main gear 3 and a fourth turboimpeller 17c formed are provided.

Both the third pinion shaft 16 and the fourth pinion shaft 17 horizontally flank the main gear 3 and lie in the main joint 5. Each of the pinion shafts 6, 12, 16, 17 is either in a respective pinion joint 9, 15 or in the main joint 5. Here each of the pinion joints 9 and 15 holds exactly one respective pinion shaft 6, 12.

Furthermore, FIG. 2 shows that the second, third, and fourth turboimpeller 12, 16, and 17 are on the respective second, third and fourth pinion shafts 10b, 10c, and 10d and outside the housing 2 and held in respective further impeller housings 11b, 11c, 11d to form respective turbostages II', III', and IV'. Similarly the shafts 6, 12, 16, and 17 form opposite turbostages II, II, III, and IV.

The invention claimed is:
1. A geared turbomachine comprising
a transmission housing having
   a stepped upper part forming a plurality of receptacles and
   a lower part joined to the upper part along a main joint having planar sections perpendicular to a vertical direction;
a main gear received in the transmission housing and rotatable therein about a horizontal axis;
respective pinion covers seated in the receptacles and connected to the upper part along respective L-shaped first pinion joints each consisting of
   a first planar horizontal section extending perpendicular to the vertical direction and offset vertically from the main joint and a first planar vertical section extending from the first horizontal section at a first angle, the pinion joints being offset from and not crossing the main joint a single respective pinion shaft in each of the;

pinion joints and rotatable in the respective pinion joint about a respective axis parallel to the horizontal axis of the main gear;

respective pinions on the pinion shafts and meshing with the main gear; and respective turboimpellers fixed to the shafts.

2. The geared turbomachine according to claim 1, wherein the first vertical section runs perpendicular to a first normal direction.

3. The geared turbomachine according to claim 1, wherein the first angle is less than or equal to 90°.

4. The geared turbomachine according to claim 1, wherein each horizontal section extends perpendicular to the vertical direction and each vertical section extends from the respective horizontal section at an angle between 30° and 90°.

5. The geared turbomachine according to claim 1, wherein all the shafts are rotatable about respective axes parallel to each other and to a rotation axis of the main gear.

6. The geared turbomachine according to claim 1, wherein the main gear is mounted on the transmission housing rotatable about a main-gear axis offset upward from the main joint.

7. The geared turbomachine according to claim 6, wherein the transmission housing is divided along the first pinion joint.

8. The geared turbomachine according to claim 1, wherein each turboimpeller is accommodated in a respective impeller housing attached to the transmission housing or formed integrally with the transmission housing.

9. The geared turbomachine according to claim 1, wherein the turboimpellers are outside the housing.

10. A geared turbomachine comprising
a transmission housing having
an upper part and a lower part joined to the upper part along a main joint extending at least in sections perpendicular to a vertical direction;

a main gear received in the transmission housing;

a first pinion cover connected to the upper part along a first pinion joint consisting of a first horizontal section extending perpendicular to the vertical direction and offset from the main joint, and a first vertical section extending from the first horizontal section at a first angle and also offset from the main joint and do not cross the main joint;

a first pinion shaft having a first shaft body in the first pinion joint and in the transmission housing;

a first pinion on the first pinion shaft and meshing with the main gear; and a first turboimpeller fixed to the first shaft body.

11. A geared turbomachine comprising
a transmission housing having
an upper part and
a lower part joined to the upper part along a main joint having planar sections perpendicular to a vertical direction;

a main gear received in the transmission housing and rotatable therein about a horizontal axis;

a first pinion cover connected to the upper part along an L-shaped first pinion joint consisting of a first planar horizontal section extending perpendicular to the vertical direction and offset vertically from the main joint and a first planar vertical section extending from the first horizontal section at a first angle and offset from and not crossing the main joint;

a first pinion shaft having a first shaft body in the first pinion joint and in the transmission housing and rotatable in the first pinion joint about an axis parallel to the horizontal axis of the main gear;

a first pinion on the first pinion shaft and meshing with the main gear; and a first turboimpeller fixed to the first shaft body.

* * * * *